BEST AVAILABLE COPY

2 Sheets—Sheet 1.

L. F. GRISWOLD.

Assignor to THE CHARLES PARKER COMPANY.

EXTENSION FIXTURE FOR LAMPS, &c.

No. 11,067. Reissued Mar. 18, 1890.

INVENTOR.

Lewis F. Griswold

WITNESSES:

Herman Hanson

Alice M. Williamson

By J. N. McIntire

Attorney.

L. F. GRISWOLD.

Assignor to THE CHARLES PARKER COMPANY.

EXTENSION FIXTURE FOR LAMPS, &c.

No. 11,067. Reissued Mar. 18, 1890.

INVENTOR:
Lewis F. Griswold

WITNESSES:
Herman Hansen.
Alice M. Williamson.

By J. N. McIntire
Attorney.

BEST AVAILABLE COPY

UNITED STATES PATENT OFFICE.

LEWIS F. GRISWOLD, OF MERIDEN, CONNECTICUT, ASSIGNOR TO THE CHARLES PARKER COMPANY, OF SAME PLACE.

EXTENSION-FIXTURE FOR LAMPS, &c.

SPECIFICATION forming part of Reissued Letters Patent No. 11,067, dated March 18, 1890.

Original No. 401,347, dated April 16, 1889. Application for reissue filed July 13, 1889. Serial No. 317,471.

*To all whom it may concern:*

Be it known that I, LEWIS F. GRISWOLD, a citizen of the United States, residing at Meriden, in the county of New Haven and State of Connecticut, have invented certain new and useful Improvements in Extension-Fixtures for Lamps, Chandeliers, and other Articles; and I do hereby declare the following to be a full, clear, and exact description of the invention, such as will enable others skilled in the art to which it appertains to make and use the same.

This invention relates to extension-fixtures for lamps, chandeliers, &c., which use a spring-drum for suspending the movable part of the fixture and its attachments, and frictional devices for resisting the turning of the drum as the lights are raised and lowered.

In the present improvement, as shown, I make use of two such frictional devices, one on each side of the drum, which is movable endwise on the shaft to bear against one or the other as the lights ascend or descend, one of said devices resisting the upward motion only and the other resisting the downward motion only. I also provide said frictional devices with means for regulating their frictional action, and provide the suspending-spring with means for adjusting its tension, so that it will counterbalance the movable part of the fixture and the lights attached thereto when the latter are midway between their highest and their lowest position, however their weight may vary. So far as I am aware, it is new to employ, in combination with a fixture having its movable part balanced in this middle position, two brakes, one retarding downward motion, the other upward motion.

Figure 1:
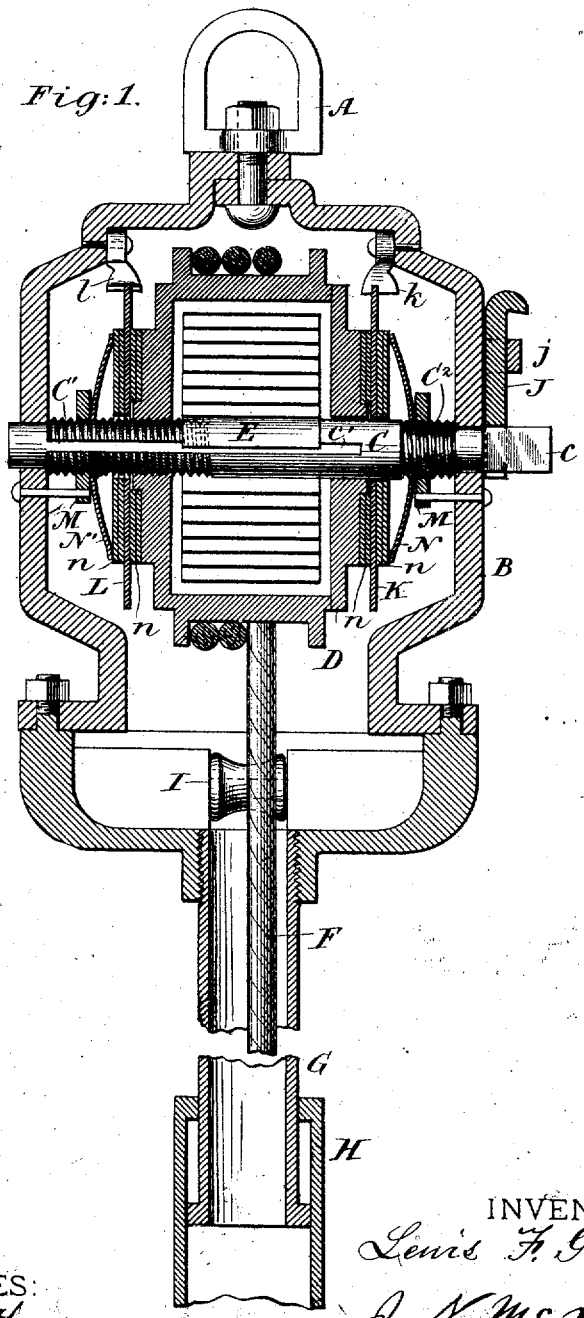
Figure 2:
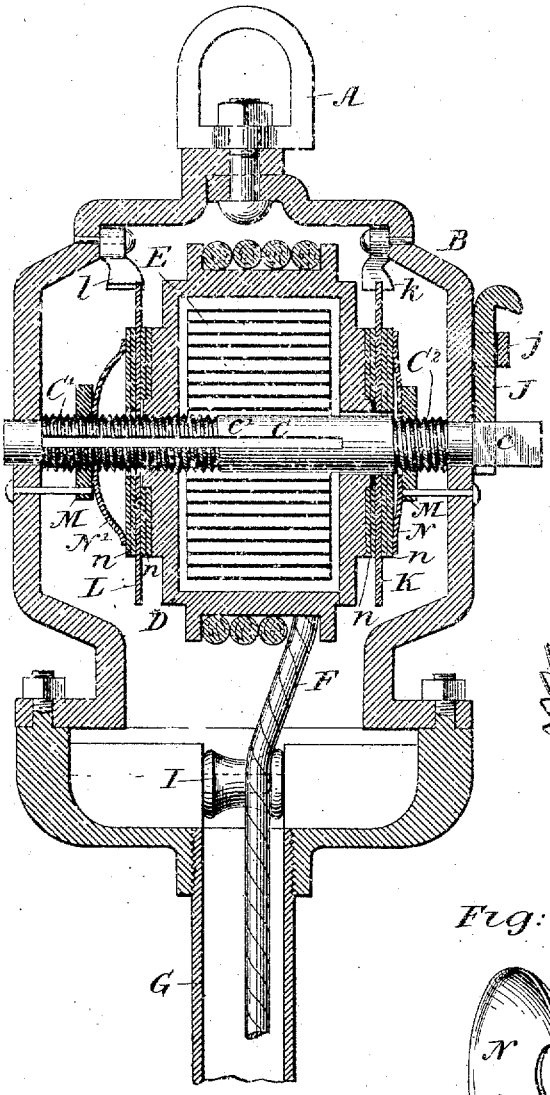
Figure 3:
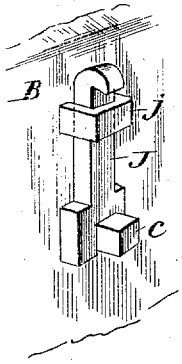
Figure 4:
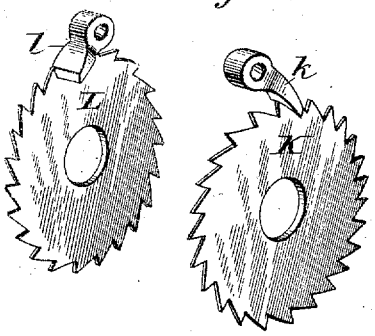
Figure 5:
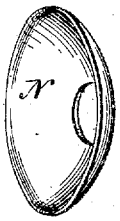

In the accompanying drawings, Figure 1 represents a vertical section through an extension-fixture for a lamp or chandelier, omitting the lower part of the lower tube and the devices attached thereto. This section is taken on the axial line of the drum-shaft, the parts being shown in the positions occupied when the lights are midway between their highest and lowest points of suspension. Fig. 2 represents a similar view, the parts being shown in the positions occupied when the lights are at their highest point of suspension. Fig. 3 represents a detail view of the winding end of the shaft and the key which locks it. Fig. 4 represents a detail view of the two disks and their pawls in perspective. Fig. 5 represents a similar view of one of the disk-shaped springs bearing thereon.

A designates the suspension eye or loop; B, the frame attached thereto; C, the shaft of the drum journaled in the sides of said frame and having a protruding prismatic or rectangular end *c*; D, the spring-drum mounted on said shaft, so as to be capable of endwise and rotatory motion thereon, and screw-threaded at one side to engage screw-threads C′ on said shaft; E, the coiled spring for counterbalancing the lamps and movable part of the fixture, said spring being, as usual, attached to said shaft at its inner end and to said drum at its outer end; F, the suspension-cord wound on said drum; G, the upper tube screwed into the lower end of said frame; H, the lower tube sliding up and down on said upper tube, and I the guide-pulley over which the cord passes. Except the special construction of the shaft and drum, the above parts are old and well known.

J designates a vertically-sliding bar having a square recess at its lower end and having a hook formed on its upper end for a handle. It is held in a guide-loop *j*, formed on the outside of frame B, and occupies a position above the protruding end *c* of said shaft. This bar forms a key for locking and unlocking said shaft. When raised out of engagement therewith, it allows said shaft to be turned for winding said spring to the desired tension. The key J is then pressed down until it bears against three of the flat faces of said rectangular end, and thereby holds said shaft against all further rotation. Brake-disks K L are arranged on said shaft and forced by springs N N′ toward drum D, which is between them, and against interposed washers *n*. Nuts M, turning on screw-threads C′ $C^2$ of shaft C, regulate the tension of said springs and hold them in place. The screw-threads $C^2$ do not engage the drum, although the screw-threads C′, as already stated, do engage it. Each brake-disk is provided with peripheral ratchet-teeth, those of disk K being engaged by a pawl *k*, and those

BEST AVAILABLE COPY of disk L by a pawl *l*. The former pawl and ratchet-teeth are arranged to hold disk K motionless when the lights descend, but allow it to turn freely when they ascend, whereas pawl *l* and the ratchet-teeth with which it engages have the reverse action with respect to disk L.

The operation is as follows: The shaft C is turned by a wrench applied to end *c* until the spring E is sufficiently wound to counterbalance the movable part of the fixture and the lamps and attachments suspended thereby when the latter are midway between the highest and lowest position. The drum and proximate parts appear as in Fig. 1 when the lights are thus suspended midway. The lights and movable part of the fixture are then raised to the highest position by hand, the spring E simultaneously turning the drum D, winding the suspension-cord thereon, and, by the engagement of the screw-threads of said drum with the screw-threads C′ on said shaft C, forcing said drum from left to right and compressing spring N, as shown in Fig. 2. The nut M, bearing against said spring, is then tightened, if necessary, until the disk K and spring N are able to hold the lamps and movable part of the fixture against descent. When the lights are pulled down by hand, the drum travels along the shaft from right to left, relieving the pressure on spring N, so that the increasing tension of the spring is compensated for by the lessening friction of the brake. On reaching the middle position, and thereafter the spring alone supports the movable part of the fixture, the disk K no longer offering any appreciable resistance; but the continued travel of the drum toward the side on which is disk L as the lights descend forces back said disk and compresses spring N′ more and more, so that when the lamp or chandelier is released by the person drawing it down the disk L, held by pawl *l*, will resist the upward motion of said lights sufficiently to compensate for the increased tension of the spring E due to such descent.

It will be seen that the pith of the main feature of my invention, therefore, lies in the combination, with a spring-drum which counterbalances the fixture to be supported at a point intermediate of its highermost and lowermost points of adjustment, of suitable means for preventing the descent of the fixture from any point above that at which the spring of the drum will hold it, and for preventing the ascent of the fixture from any point below that at which the weight of the fixture counterbalances the force of the spring.

The axis or shaft C is provided with a longitudinal slot *c*′, which receives the inner end of the spring and allows said spring to move endwise with drum D without separating.

Having thus described my invention, what I claim as new, and desire to secure by Letters Patent, is—

1. In a suspension device, the combination, with the spring-actuated drum and a spring which counterbalances the suspended article at a locality intermediate of its highermost and lowermost points of adjustment, of suitable means offering a frictional impediment or resistance against any downward movement of the suspended article when the latter may be adjusted above the point at which its weight is counterbalanced by the said spring, and also offering a frictional impediment against any ascent of the suspended article whenever the latter may be adjusted to a point below that at which its weight is counterbalanced by the said spring, all substantially as set forth.

2. The combination of a shaft, a drum movable endwise thereon, a friction-brake on each side of and with which said drum is brought into contact alternately by its endwise movements on said shaft, a suspending-cord wound on said drum, and a spring actuating the latter, substantially as set forth.

3. A spring-actuated drum, a shaft with which said drum has screw-thread connections, and a friction device on each side of said drum, the said frictional devices being arranged for contact alternately with said drum as the latter moves in opposite directions, substantially as set forth.

4. In combination with a shaft having screw-threads, a spring-actuated drum movably mounted on said shaft and having screw-threads which engage with the threads thereof, a brake-disk arranged on each side of said drum and having peripheral ratchet-teeth facing in opposite directions, pawls engaging with said teeth, and springs which force said disks toward said drum, all substantially as and for the purposes set forth.

In testimony whereof I affix my signature, this 21st day of June, 1889, in presence of two witnesses.

LEWIS F. GRISWOLD.

Witnesses:
W. H. LYON,
C. W. KING.